O. A. Dailey,

Hat Box,

No. 2,040. Reissued Aug. 1, 1865.

Witnesses.
Orlando Knight
Abr. A. C. Flanders

Inventor.
O. A. Dailey

N. PETERS, PHOTO-LITHOGRAPHER, WASHINGTON, D. C.

UNITED STATES PATENT OFFICE.

OLIVER A. DAILEY, OF WASHINGTON, DISTRICT OF COLUMBIA.

IMPROVEMENT IN BOXES FOR HATS AND BONNETS.

Specification forming part of Letters Patent No. 46,782, dated March 14, 1865; Reissue No. 2,040, dated August 1, 1865.

*To all whom it may concern:*

Be it known that I, OLIVER A. DAILEY, M. D., of the city and county of Washington, in the District of Columbia, have invented a new and useful Improvement in Hat and Bonnet Boxes; and I do hereby declare the following to be a full, clear, and exact description of the same, reference being had to the accompanying drawings, which are made part of this specification, and in which—

Figure 1:
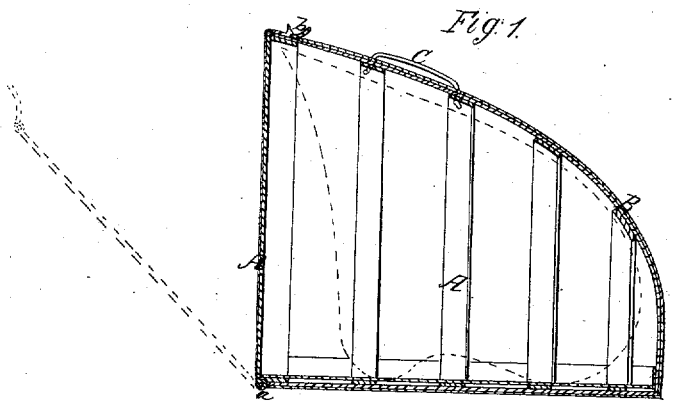
Figure 2:
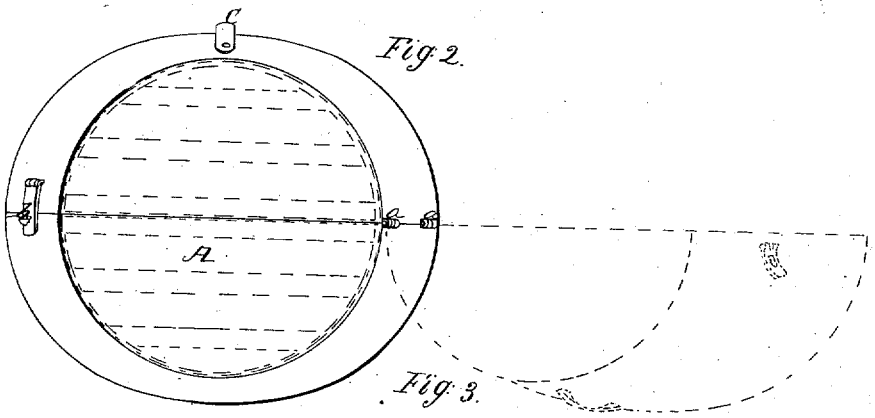
Figure 3:
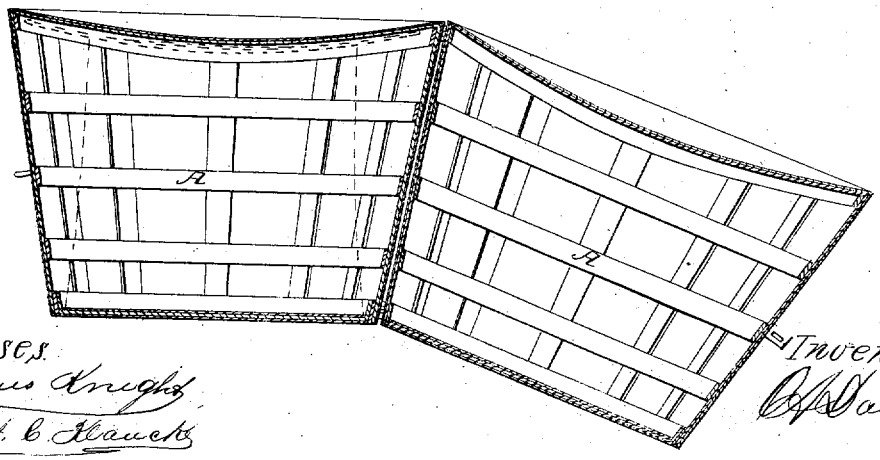

Figure 1 is a central section of a box for containing bonnets, illustrative of my invention. Fig. 2 is an end view representing a box for containing hats, which also illustrates my invention. Fig. 3 is a top view of the same open.

Similar letters of reference indicate corresponding parts in the several figures.

My said invention consists in strengthening a box to contain hats and bonnets by means of a frame composed of ribs or strips.

The object is to provide a box of the kind specified, which will protect its contents from being mashed or pressed out of shape either when packed in a trunk or under other circumstances where it is subjected to rough usage during transportation, and while effecting this, to obtain an article which shall be at once light and durable.

The following description will enable others skilled in the art to which my invention appertains to fully understand and use the same.

In the accompanying drawings, A B represent a box or depository adapted to contain hats or bonnets, as the case may be. The part designated by A is a frame, composed of ribs or strips made of metal or other suitable material, and fastened together at such distances asunder as to make a frame of a portable character, yet of such strength as to effectually protect its contents from injury by external pressure. This frame may be covered by or may inclose a shielding medium, B, consisting of leather, cloth, paper, wood, or any other desirable material. The frame may be of circular, elliptical, square, or other form, or may be fashioned in conformity with the shape of the hat or bonnet it is to contain, and may be provided with a handle, C, in order that it may be readily carried about by hand. The hat or bonnet can be inserted through a door, as at A′, Fig. 1, or the box may be divided at the middle for this purpose, as shown in Figs. 2 and 3. The door A′ is hinged at *a*, and the box is furnished with a catch, *b*, to retain the door in its closed position.

The above-described box will effectually preserve from injury a hat, bonnet, or similar delicate article composing part of the contents of a tightly-packed trunk during transportation, and at the same time it occupies practically less room within a trunk than the article which it may inclose.

It is manifest that while it subserves all the purposes of the ordinary bandbox, it will prove sufficient under circumstances of rough treatment where the common bandbox would be destroyed.

The material of which the frame A and cover B are composed is an optional matter, as also the use of the frame on the inside or outside or of the box; and I further remark that the size and number of the ribs constituting the frame A may be varied to any extent so long as such variation is not in conflict with the principle upon which this invention is based—that is to say, the provision of a strengthening-frame, of a light portable character, to protect bandboxes to be carried in trunks or otherwise.

I contemplate such modifications as will improve the appearance and increase the durability of the box, and such as may be required to suit the taste of the user. Therefore I do not wish to be understood as limiting myself to the specific details herein given.

I propose to give the desired shape to the ribs by hot or cold dies, rollers, or any other means; or the ribs and cover may be together pressed into shape.

It is obvious that a box adapted for hats or various patterns may in like manner be adapted for bonnets without changing the character of the invention.

Having thus described my invention, the following is what I claim as new and desire to secure by Letters Patent:

A hat-box made of paper, cloth, leather, or the equivalent thereof with respect to lightness, and strengthened by the use of ribs, substantially as described.

O. A. DAILEY.

Witnesses:
C. D. SMITH,
W. F. HALL.